United States Patent

[11] 3,550,515

[72] Inventor Irving Erlichmann
 Natick, Mass.
[21] Appl. No. 734,310
[22] Filed June 4, 1968
[45] Patented Dec. 29, 1970
[73] Assignee Polaroid Corporation
 Cambridge, Mass.
 a corporation of Delaware

[54] PHOTOGRAPHIC APPARATUS AND FILM ASSEMBLAGE FOR USE THEREWITH
 23 Claims, 7 Drawing Figs.
[52] U.S. Cl. .................................................. 95/13, 95/22
[51] Int. Cl. .................................................. G03b 17/52
[50] Field of Search .......................................... 95/13, 18, 21, 22

[56] References Cited
 UNITED STATES PATENTS
 3,426,664 2/1969 Norton .......................... 95/13

Primary Examiner—John M. Horan
Assistant Examiner—Richard L. Moses
Attorneys—Brown and Mikulka, Robert E. Corb and Alfred E. Corrigan ABSTRACT: A self-developing camera including a motor and a pair of processing rolls for use with a film assemblage including a container with an exposure aperture enclosing a plurality of film units stacked behind the aperture and encompassed by an endless belt. The belt is adapted to be driven by the motor and includes an opening therein and an opaque section adapted to be moved into alignment with the exposure aperture, and members for engaging and moving an exposed film unit from the container into the nip of the processing rolls. The belt also includes structure for controlling the operation of the motor to position the opening in the belt in alignment with the exposure aperture to permit exposure of a film unit and to position the opaque section of the belt in closing relation to the exposure aperture to permit the film assemblage to be removed from the camera without exposing a film unit.

INVENTOR.
Irving Erlichman
BY Brown and Mikulka
and
Alfred E. Corrigan
ATTORNEYS

PHOTOGRAPHIC APPARATUS AND FILM ASSEMBLAGE FOR USE THEREWITH

The camera of the present invention is especially designed for use with a film assemblage including a container housing a plurality of photosensitive elements or film units arranged in stacked relation and adapted to be exposed, in sequence, by light transmitted through an exposure aperture in a wall of the container and withdrawn therefrom following exposure. Subsequent to being withdrawn from the container, each film unit including, for an example, a photosensitive element and a superposed image-receiving element, is processed by moving the superposed elements between a pair of juxtaposed pressure-applying members, usually rolls, located within the photographic apparatus adjacent an opening in an end wall of the film container, in order to distribute a processing liquid between the superposed elements.

Heretofore, the film units in self-developing cameras were withdrawn from the camera by either manually grasping and pulling a leader which protrudes from the camera and is attached to a film unit or by employing a pick-type device which would engage the film unit within the film container and advance it therefrom into the nip of a pair of processing rolls. With either of the above arrangements, the film assemblage included a light shield or dark slide in the form of a sheet of opaque material positioned in closing relation to the exposure aperture. After the film assemblage was loaded into the camera, the light shield was removed from the film assemblage and discarded. If, after the user of the camera had exposed one or more film units and he desired to change to a different type of film, e.g., from black-and-white to color, he could not do so without needlessly exposing at least the film unit located immediately adjacent the exposure aperture. An object of the invention is to provide a film assemblage including a plurality of stacked film units positioned within a container having an exposure aperture, said film units being encompassed by an endless belt including means for opening or closing the exposure aperture and photographic apparatus especially designed for use with said film assemblage including means for moving said belt to open or close said exposure aperture.

Another object of the invention is to provide in a film assemblage of the foregoing type means coupled with the belt for engaging and moving a film unit into the nip of a pair of processing rolls.

Another object of the invention is to provide in a film assemblage of the foregoing type control means for controlling the movement of the belt.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 2:
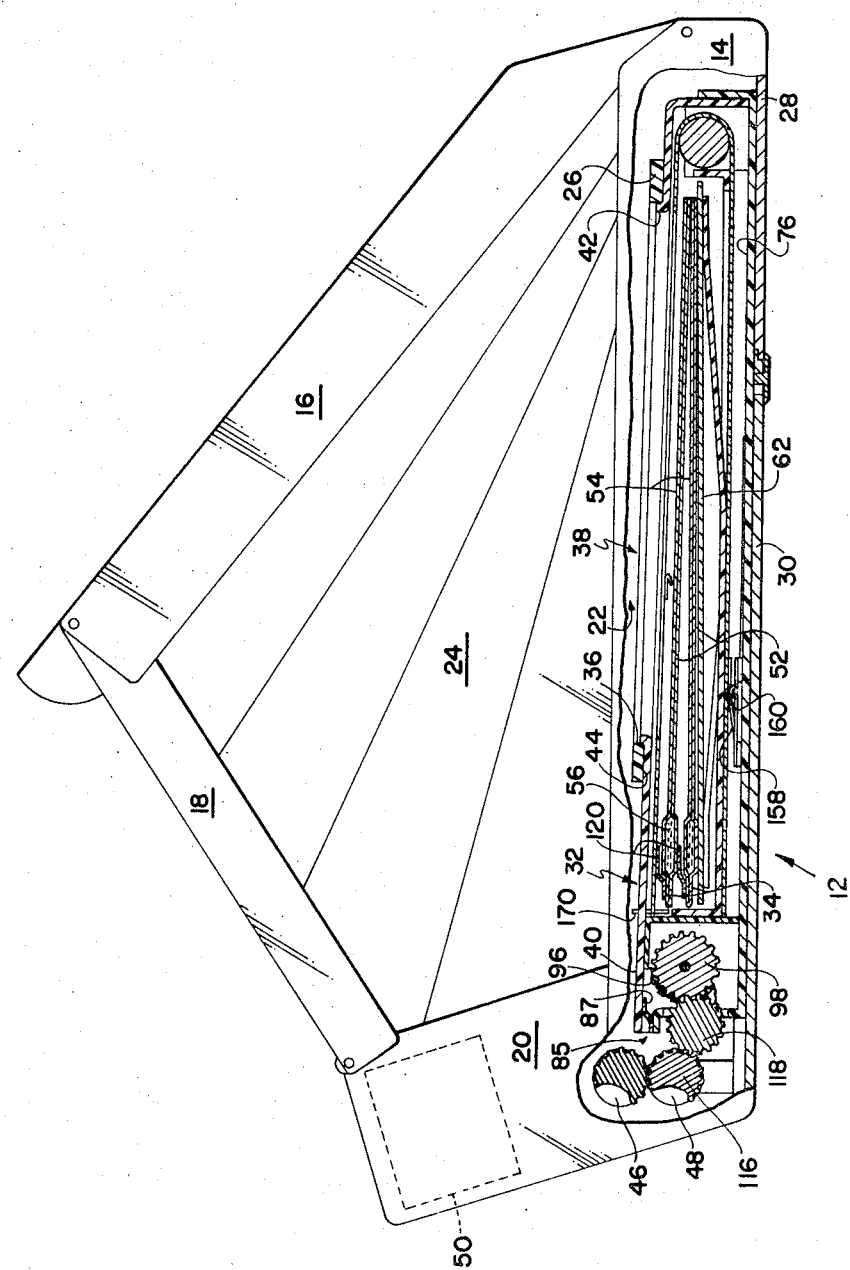
FIG. 2 is an elevation view, partially in section, of photographic apparatus embodying the invention, the cross section of the film assemblage being taken substantially along the line 2-2 of FIG. 1.

Reference is now made to the drawings wherein is illustrated a camera 12 incorporating one form of the instant invention. Camera 12, which is of the collapsible type, is shown in FIG. 2 in its operative or extended position and is comprised of a plurality of sections 14, 16, 18, 20 pivotally connected to each other and which define four sides of a substantially light-free exposure chamber 22. The other sides of the exposure chamber are closed by a pair of extensible bellows 24 (only one of which is shown). Section 14 is provided with a support means in the form of a forward wall 26 which cooperates with a door 28 and a rear wall 30 to properly position a film assembly 32 containing a plurality of stacked film units 34 within the camera such that an end (forwardmost) film unit is in position for exposure. Forward wall 26 is provided with an aperture 36, similar to and in alignment with an aperture 38 of container 40, into which a lip 42 on container 40 protrudes. Wall 26 has a rear surface 44 which is located substantially in the focal plane of the camera. Wall 30 may be provided with suitable means, e.g., a spring or an elastomeric pad, for urging the container 40 towards forward wall 26. Section 20 is provided with a conventional lens and shutter assembly, the latter preferably being of the automatic type, for exposing a film unit 34 positioned for exposure within the camera housing. An interior wall of section 16 is provided with a substantially planar mirror for reflecting light from the lens towards a film unit positioned for exposure in section 14.

The camera includes a pair of pressure-applying members or rolls 46, 48 mounted in juxtaposition within section 14 and a motor 50 for driving the rolls mounted in section 20. The rolls 46, 48 are adapted to receive a film unit, subsequent to exposure, in their bite and apply sufficient pressure to break a pod of processing liquid and evenly distribute the processing liquid between the sheets comprising the film unit to produce a positive photographic print while simultaneously advancing the film unit through the camera. For a more detailed description of other features of the camera, reference is made to the copending U.S. Pat. application of Land et al. Ser. No. 655,850, filed Jul. 25, 1967.

Positioned within container 40 are a plurality of stacked film units 34, only two of which are shown, having photosensitive surfaces facing exposure aperture 38. Film units 34 are preferably of the type shown and described in detail in the U.S. Pat. application of Edwin H. Land, Ser. No. 622,287 and Edwin H. Land et al. Ser. No. 622,286, both filed Mar. 10, 1967. Film units of this type each incorporates all of the materials necessary to produce a positive photographic print including a photosensitive element 52, a second or image-receiving element 54 which is transparent and is secured in face-to-face relation with the photosensitive element, and a rupturable pod 56 of processing liquid secured to one end of the photosensitive and second elements for dispensing its liquid contents therebetween in response to the application of compressive pressure to the pod 56. Each film unit is adapted to be processed by advancing the film unit, pod 56 foremost, between a pair of pressure-applying members 46, 48 which dispense the liquid contents of the pod therefrom between the photosensitive and second elements and spread the liquid between and in contact with the two elements toward the trailing end thereof.

The image-forming process is well known in the art and involves the formation of an imagewise distribution of transferably image-forming substances in the exposed photosensitive element and diffusion of the image-forming substances to another layer within the film unit where they form a visible, positive image. As described in the aforementioned applications, the processing liquid includes an opacifying agent which is spread in a layer between the photosensitive element (which is preferably opaque to actinic light), and the transparent image-receiving element 54 for providing a background for the positive transfer image and masking any image formed in the photosensitive element.

Camera size can be reduced and a higher degree of compactness achieved by eliminating the necessity for a processing or imbibition chamber in the camera into which the film unit is advanced and retained in a light-free environment during image formation. Accordingly, the film unit is designed to be advanced from the camera into the light immediately after the processing liquid is distributed within the film unit which means that spreading of the processing liquid must be effective to prevent further exposure of the photosensitive elements almost immediately as it (liquid spreading) occurs. The opacifying agent in the processing liquid functions to prevent exposure of the photosensitive element to light transmitted by the transparent second element 46 during processing outside the camera.

Figure 3:
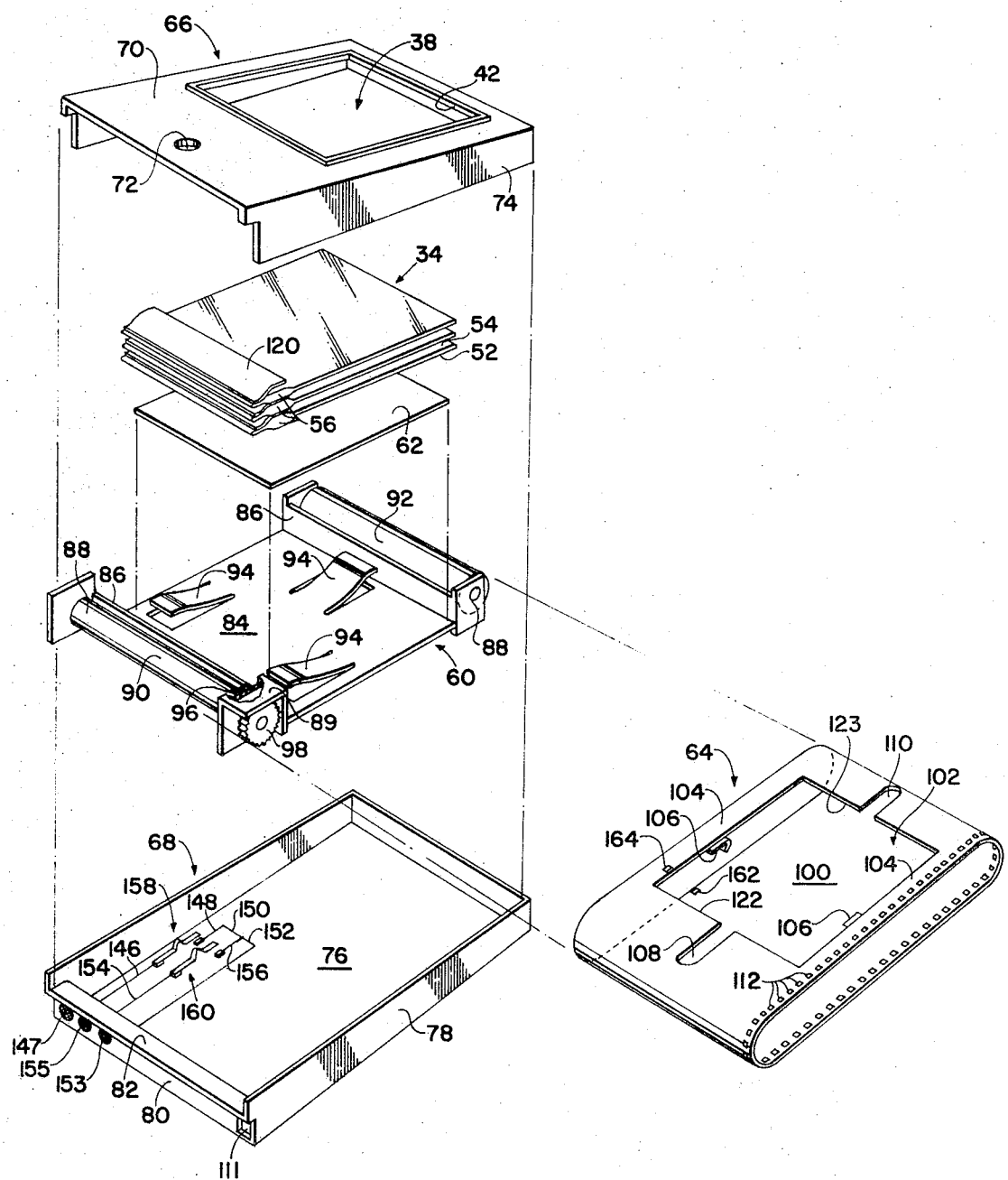
FIG. 3 is an exploded perspective view of a film assemblage including a switch arrangement adapted to be employed in the photographic apparatus of FIG. 2.

In addition to the film units 34 and the container 40, the film assemblage 32 is comprised of a support member 60, a pressure plate 62 and an endless belt 64. As shown in FIG. 3, container 40 is comprised of a front section 66 and a rear section 68. Front section 66 includes a front wall 70 having an exposure aperture or light-transmitting section 38 therein and an opening 72, the function of which will be explained hereinafter. Depending from wall 70 on three sides thereof is a flange 74. Section 68 includes a rear wall 76 having flange member 78 extending therefrom on three sides thereof at a right angle to the wall 76. The fourth side of wall 76 is provided with an upwardly extending flange 80 which terminates at a lip 82. Front section 66 is dimensioned to have its flange 74 nest within and closely adjacent to flange 78 of rear member 68. In this nested position lip 82 cooperates with the adjacent portion of wall 70 to define an opening 85 through which the film units are advanced subsequent to exposure. As can be seen in FIG. 2, opening 85 is provided with an appropriate light seal 87.

Support member 60 is formed from a single piece of material e.g., plastic or sheet metal, and includes a support surface 84 having upturned end sections 86 and a plurality of integral biasing means 94 adapted to contact and urge pressure plate 62 into contact with the rearwardmost film unit in the stack for urging the film units 34 toward the exposure aperture 38. The ends of sections 86 are bent or formed at right angles to section 86 to form a pair of ears 88 for suitable rotatably supporting rolls 90, 92. Roll 90 is provided at one end with a sprocket 96 and a gear 98 for rotating sprocket 96, the sprocket and gear being positioned on opposite sides of one of the ears 88.

Belt 64, which may be formed from any suitable pliable opaque material, e.g., paper or vinyl plastic, includes an opaque section 100 and an opening 102 therein. Opening 102 is bounded on two sides by strips 104 each of which has attached to its interior surface a flexible tab 106 for engaging a film unit as will be explained hereinafter. Opaque section 100 is provided with elongated slots 108, 110. Slots 108, 110 allow the belt to move between a first position in which opening 102 is in register with the light-transmitting area 38 of container 40 and a second position wherein the opaque section 100 is in register with the light-transmitting area so as to prevent the passage of light therethrough despite the presence of a pin 170 for preventing the forwardmost film unit from being advanced from the film assemblage. One of the sides of the belt is provided with a series of openings 112 which cooperate with the teeth of sprocket 96 to move the belt 64 in a counterclockwise manner (as viewed in FIG. 2).

Each of the smooth cylindrical rolls 46, 48 is provided at one end thereof with a gear 116, said gears 116 being meshed with each other to provide for simultaneous rotation and similar velocity of rolls 46, 48. At least one of the gears 116 is suitably coupled with a source of power, e.g., motor 50, for imparting rotation to rolls 46, 48. Roll 48 is in turn drivingly coupled to gear 98 via transmission means in the form of an idler gear 118 for imparting rotation to sprocket wheel 96 to drive belt 64 in a counterclockwise direction as viewed in FIG. 2. Belt 64 continues to rotate in a counterclockwise direction until resilient tab 106 engages a tab 120 fixedly attached to film unit 34 near its leading edge. Engagement of tabs 106, 120 with each other and continued rotation of the belt 64 will move the forwardmost film unit 34 towards opening 85 and the nip of rolls 46, 48. It will be noted that edge portion 122 of belt 64 has moved to a position wherein it has passed at least partially around roll 90 before tab 106 engages tab 120 on film unit 34. It will also be noted that the length of opening 102 as measured in the direction of movement of the belt is less than the length of the film units and that the width of the film unit is slightly less than the width of opening 102 so as to allow the film unit to exit from the container 40 via passing through opening 102 in belt 64 and opening or slot 85 in container 40. The ratio between gears 116, 118, 98 and sprocket 96 is such that rolls 46, 48 withdraw the film unit from the film assemblage at a greater linear rate than the belt to insure that the trailing edge of the film unit passes through opening 102 prior to edge 123 of belt 64 passing around roll 90.

Figure 7:
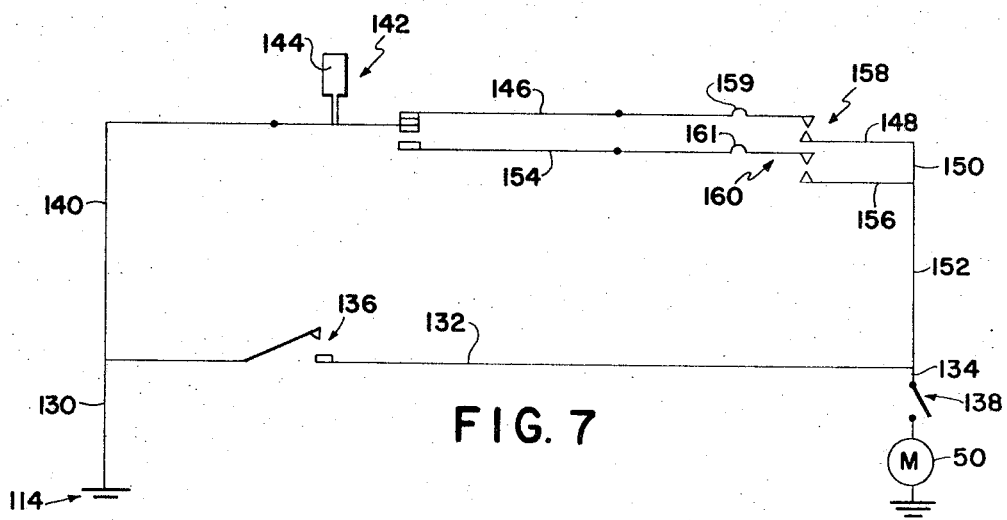
FIG. 7 is a schematic presentation of a circuit embodied in the instant invention.

In order to insure that the opening 102 of belt 64 is in register with the light-transmitting section 38 of container 40 when it is desired to expose the forwardmost film unit, an electrical circuit similar to that shown in FIG. 7 is provided. Battery 114, which is suitably located in the camera, is connected to motor 50 via lines 130, 132 and 134. Line 132 is provided with a normally open switch 136 which is momentarily closed by actuating the camera's shutter assembly; and line 134 is provided with a normally open switch 138 which is moved to the closed position in response to closing of the door 28 of the camera or by any other suitable means which is adapted to be actuated subsequent to a film assemblage being positioned within the camera. Connected in parallel with line 132 is a line 140 which terminates in a single-pole double-throw switch 142 having an actuating member 144 which is accessible from the exterior of the camera. Switch 142, which is normally connected with line 146 when the film assemblage is positioned within the camera, is adapted to direct a flow of current to motor 50 via either lines 146, 148, 150, 152, 134 and switch 138 or via lines 154, 156, 152, 134 and switch 138. Line 146, 148 includes a normally open switch 158 and line 154, 156 a normally open switch 160. Switches 158 and 160 which may be mounted in rear section 76 are biased to an open position by any suitable means and are adapted to be opened and closed by motor controls associated with belt 64.

As can be seen in FIG. 3, belt 64 is provided with motor controls in the form of apertures 162 and 164. Aperture 162 is located adjacent the side edge of the belt while switch 164 is located further inboard, i.e., closer to opening 102. Aperture 162 is bisected by a vertical plane (as viewed in FIG. 3) passing through switch 158 while aperture 164 is bisected by a vertical plane passing through switch 160.

Figure 1:
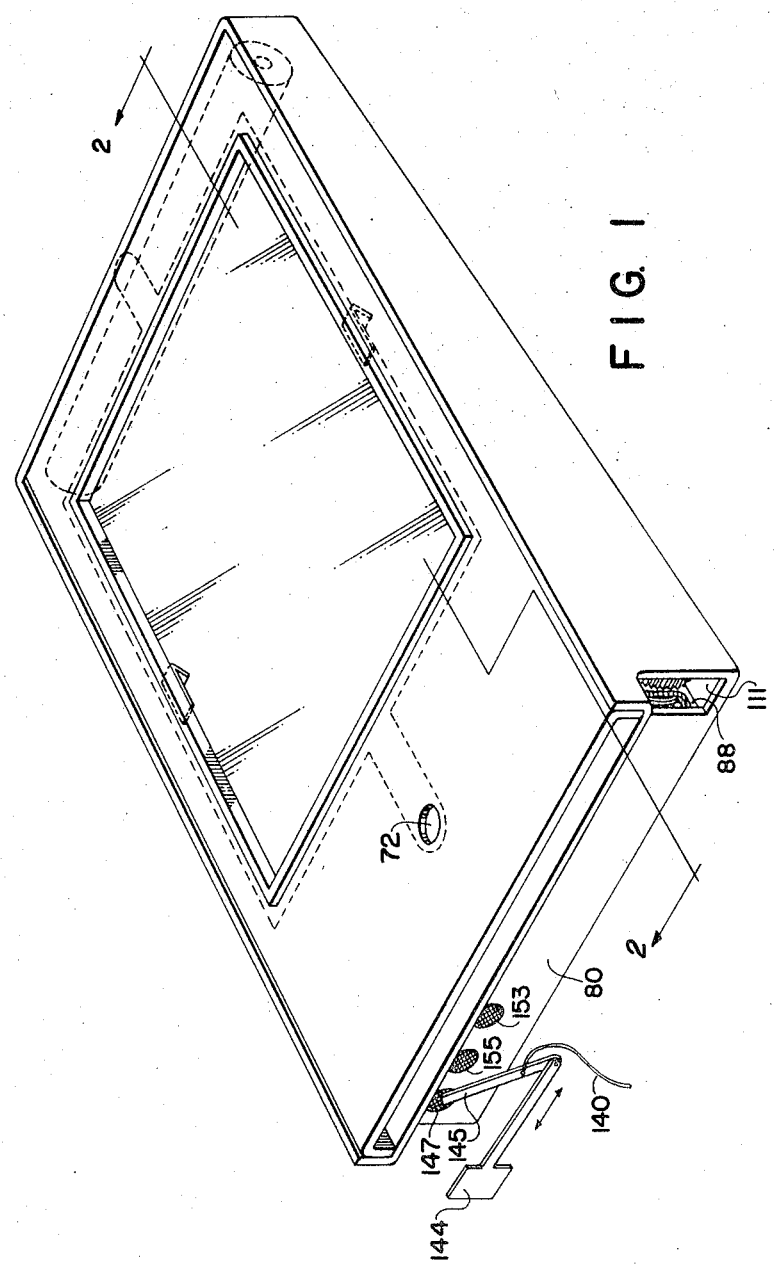
FIG. 1 is a perspective view of a film assemblage embodied by the invention.

As should be apparent from FIG. 3, the film assemblage is assembled by encircling support member 60, pressure plate 62 and film units 34 with belt 64 such that opening 102 in belt 64 is located underneath support member 60 and apertures 112 are operatively engaged by the teeth of sprocket 96. The thus assembled members are then enclosed by forward and rear sections 66, 68, respectively, and the assemblage subsequently placed in the camera 12. By properly positioning the film assemblage within the camera, idler gear 118 is brought into engagement with gear 98 via opening 111 in wall 80 of rear section 68 while simultaneously line 140 is connected to line 146 via switch 142. Ear 88, which is located adjacent gear 98, is positioned closely adjacent wall 80 and cooperates with a shield 89 which extends to a position closely adjacent flange 74 to prevent any light entering opening 111 from exposing one of the film units. As can be seen in FIG. 1, actuating member 144 is pivotally coupled with a contact arm 145 for movement into contact with either electrical contact 147 or 155 to electrically connect line 140 with either line 146 or 154 respectively. A third contact 153 connected to line 152 is provided on wall 80 of rear section 78 for directing the flow of current from line 152 to the motor. In this latter position, i.e., with opening 102 positioned below the film units, neither of the apertures 162, 164 is located directly above its respective switch 158, 160 thereby resulting in the belt, which is in contact with the movable portion of the switches 158, 160, maintaining the switches in a closed position. The door 28 is now closed thereby closing switch 138 or alternatively the door 28 may be closed and a manually operated switch adapted to be actuated subsequent to the closing of the door is utilized to close switch 138. Closing of switch 138 completes a circuit through motor 50 thereby causing rolls 46, 48 to rotate and belt 64 to move in a counterclockwise direction as mentioned heretofore. The completed circuit would be 130, 140, 142, 146, 158, 148, 150, 152, 134, 138 and motor 50. Belt 64 continues to move until the opening 102 of belt 64 is in register with the light-transmitting section 38 of container 40. At this point aperture 162 in belt 64 is located immediately above switch 158. Switch 158, which as mentioned previously, is biased to the open position, has a raised portion 159 which usually contacts belt 64. When aperture 162 is located above raised portion 159, it (the raised portion) enters the aperture due to its tendency to assume an open position thereby opening switch 158 to stop motor 50, rolls 46, 48 and belt 64. This is the position shown in FIG. 2.

With opening 102 and light-transmitting section 38 in register the forwardmost film unit 34 may now be exposed. Actuation of the shutter mechanism operates the shutter and momentarily closes switch 136 to energize motor 50. Motor 50 drives belt 64 a sufficient distance to allow aperture 162 to move to a position wherein the raised portion 159 contacts the material of the belt and is moved to a closed position. Switch 136 is then automatically moved to its normally open position, but, since switch 158 is now being held in a closed position, motor 50 continues to drive rolls 46, 48 and belt 64. Belt 64 will move in a counterclockwise manner (as viewed in FIG. 2) until resilient tab 106 on belt 64 engages tab 120 on the forwardmost film unit 34. Continued rotation of belt 64 will now advance the film unit towards the bite of rolls 46, 48. Subsequent to the edge portion 122 of belt 64 passing partially around roll 90, the leading edge of the film unit is directed through opening 102 in belt 64. Tabs 106 continue to advance the film unit through the opening 102 until the leading edge of the film unit is engaged by the rolls 46, 48. As mentioned heretofore, rolls 46, 48 advance the film unit at a greater linear rate than belt 64 thereby insuring that the film unit 34 will be advanced through the opening 102 before the edge 123 of belt 64 comes in contact with roll 90. During this movement, aperture 164 in belt 64 is moved to a position wherein it is located directly above switch 160. Switch 160 includes a raised portion 161 which protrudes into the aperture 164 thereby allowing switch 160 to assume an open position. However, since switch 142 is directing current solely through line 146 at this time, opening and closing of switch 160 has no effect upon the operation of motor 50, rolls 46, 48 and belt 64. Belt 64 continues to be advanced until aperture 162 has been rotated through 360°, i.e., it has returned to its original position located immediately above raised portion 159 on switch 158 to allow switch 158 to assume an open position thereby stopping motor 50, rolls 46, 48 and belt 64.

If it should be desired to change the type of film units being utilized in the camera at the present time, for example, from black-and-white to color, means are provided for removing the film assemblage 32 from the camera without inadvertently exposing the forwardmost film unit. Switch-actuating member 144 is moved to the left as viewed in FIG. 1 to rotate arm 145 to a position wherein it contacts contact area 155. In this position line 140 which is attached to arm 145 directs current from power source 114 to switch 160 via line 154. Movement of actuating member 144 to the left also moves a pin 170 into hole 72 of container 40 wherein it is located adjacent to and in the path of travel of the forwardmost film unit 34. Hole 72 is provided with a suitable light shield, e.g., a circular piece of plastic having radially extending slits therein which start at the center of the piece and terminate just short of the peripheral edge of the piece. Since switch 160 at this time is being maintained in a closed position due to its contact with the material of belt 64, motor 50 is actuated to drive rolls 46, 48 and belt 64. Belt 64 rotates in a counterclockwise direction as viewed in FIG. 2 until resilient tab 106 on belt 64 contacts tab 120 on film unit 34. Engagement of tab 120 by tab 106 would normally cause the forwardmost film unit to be advanced to the left towards the rolls 46, 48. However, movement of the film unit 34 is now precluded due to the positioning of pin 170 in the path of travel of the film unit from the container. Belt 64 continues to rotate and tab 106 disengages itself from tab 120 due to the resiliency of tab 106. The belt 64 continues to be advanced by motor 50 until aperture 164 on belt 64 is located immediately above switch 160. In this latter position, raised portion 161 of switch 160 extends into aperture 164 to open switch 160 thereby stopping the operation of motor 50, rolls 46, 48 and belt 64. In this position the opaque section 100 of belt 64 is in register with the light-transmitting section 38 of container 40 so as to prevent the passage of light therethrough. Door 28 of camera 12 may now be opened, the film assemblage 32 removed therefrom and another film assemblage substituted therefore.

Figure 4:
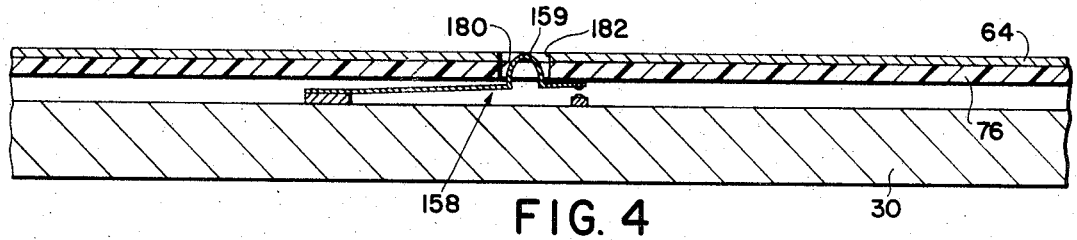
FIG. 4 is an elevation view, in section, of a section of the photographic apparatus showing a modified switch arrangement adapted to be utilized in the instant invention.

FIG. 4 shows a modification of the switching arrangement shown in FIGS. 1–3. In this embodiment, the switch 158 is mounted on the rear wall 30 of camera 12. Rear section 76 of film container 40 is provided with an aperture 180 and belt 64 is provided with an aperture 132. When a film assemblage is initially positioned within camera 12, raised portion 159 of switch 158 is maintained in a closed position by belt 64 until such time as aperture 182 in belt 64 is superposed over aperture 180 in rear section 76. Switch 160 is provided with a similar arrangement.

Figure 5:
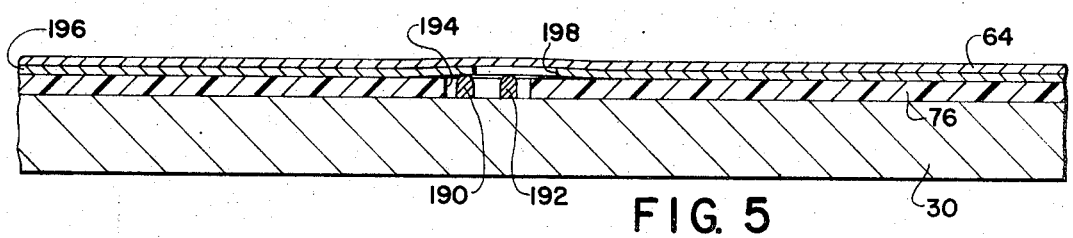
FIG. 5 is an elevation view, in section, of a further modified switch arrangement.
Figure 6:
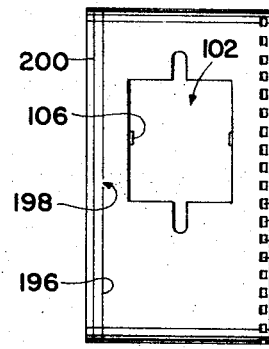
FIG. 6 is a plan view of a belt for use with the switch arrangement shown in FIG. 5.

In FIG. 5 a still further modification of a switching arrangement is shown. Herein, the switch 158 is replaced by a pair of pins 190, 192 mounted on wall 30 of camera 12. Pins 190, 192 are adapted to protrude through an opening 194 in the rear wall 76 of film container 40. Belt 64 is provided with a strip of any suitable conducting material 196 which extends in the direction of movement of belt 64 throughout the length of belt 64 except for a portion 198 of the belt normally occupied by aperture 164. As can be seen in FIG. 5, a flow of current from pin 190 to pin 192 is possible only when the conducting material 196 is in contact with both pins 190 and 192. In the position shown in FIG. 5, the opening 102 of belt 64 is in register with the light-transmitting section 38 of container 40. A second set of pins (not shown) are provided in place of switch 160 and the belt 64 is provided with a second strip of conducting material 200 having an opening (not shown) therein which would normally be occupied by aperture 162.

Although the invention has been disclosed as being incorporated with an electrically driven motor, it should be obvious that other power means such as a spring wound motor could be substituted for the electric motor. The spring wound motor could be controlled by an escapement type device wherein instead of the apertures 162, 164 operating switches 158, 160 to control the flow of current through the motor, the apertures could move the pawl of the escapement type device into the ratchet to stop the motor. Also, the sprocket drive 96 for the belt and gear 98 could be replaced by substituting a gear for sprocket 96 and placing the teeth thereof in engagement with the teeth of gear 118. In this manner, belt 64 would be wedged between the teeth of the two gears when the film assemblage is inserted into the camera. With this construction the width of the film pack would be reduced by the thickness of gear 98. Needless to say, the shape of the teeth must be such that they would not damage the belt.

It should also be noted that opening 38 in forward section 66 could be replaced by a transparent section such as clear plastic.

From the foregoing it is apparent that there has been disclosed a novel apparatus for automatically advancing a film unit, subsequent to exposure, from a film assemblage into the bite of an advancing means whereat the film unit is processed and advanced simultaneously.

Since certain changes may be made in the above apparatus without departing from the scope of the invention herein involved, it is intended that all matter contained in the above description or shown in the accompanying drawings shall be interpreted as illustrative and not in a limiting sense.

I claim:
1. Photographic apparatus for use with a film assemblage of the type including a container having a light-transmitting area and an elongated slot, said container housing a plurality of film units in stacked relation with the photosensitive surface of the foremost film unit positioned adjacent said light-transmitting area and an end of said foremost film unit being positioned adjacent said slot, said film units being encompassed by a belt having an opaque section and an opening therein and means coupled with said belt for engaging and partially moving a film unit through said opening and said slot, said apparatus comprising, in combination:

advancement means for engaging and advancing a film unit exterior of a film assemblage;

means for positioning a container of film units having an end wall with the elongated slot therein adjacent said advancement means;

a motor coupled with said advancement means for driving the latter to advance a film unit exterior said container;

transmission means for coupling said motor to the belt of said film assemblage for advancing said film unit into engagement with said advancement means and for moving said belt between a first position in which an opening in said belt is in register with the light-transmitting area so as to allow light to be transmitted therethrough, and a second position wherein an opaque section of said belt is in register with said light-transmitting area to prevent the passage of light therethrough and back to said first position; and first control means for controlling the operation of said motor positioned to be engaged by motor controls associated with said belt.

2. Photographic apparatus as defined in claim 1 further including second control means positioned to be engaged by said motor controls for energizing said motor to move said belt from said first position to said second position.

3. Photographic apparatus as defined in claim 2 including means for initiating movement of said belt.

4. Photographic apparatus as defined in claim 3 further including selector means for selectively connecting either of said first or second control means with a source of electrical power.

5. Photographic apparatus as defined in claim 4 further including stop means movable into engagement with one of said film units for preventing the withdrawal of said one film unit from said container when said selector means connects said second control means with said source of power.

6. Photographic apparatus as defined in claim 4 further including normally open switch means connected in series with said first and second control means for preventing a flow of current through said motor and means for closing said switch means to enable either said first or second control means to conduct a flow of current from said source of power to said motor.

7. Photographic apparatus as defined in claim 1 wherein said transmission means includes means for moving said film unit from said container towards said advancement means at a slower linear rate than the film unit is advanced by said advancement means.

8. A photographic film assemblage comprising, in combination:

a plurality of film units;

a container housing said film units, said container having a wall including a light-transmitting area for admitting light into said container to expose said film units and an elongated slot in one end of said container through which said film units are adapted to be advanced individually;

a belt within said container encompassing said film units, said belt including an opening, a light opaque section and film-engaging means for engaging and partially moving one of said film units through said opening and said slot; and means supporting said belt for movement between a first position wherein said opening is in register with said light-transmitting area to allow light to be transmitted therethrough for exposing one of said film units, and a second position in which said light opaque section is in register with said light-transmitting area so as to prevent the passage of light therethrough.

9. A photographic film assemblage as defined in claim 8 including means for coupling said belt with an external motor for driving said belt.

10 A photographic film assemblage as defined in claim 9 wherein said belt includes control means for controlling the operation of said external motor.

11. A photographic film assemblage as defined in claim 9 wherein said external motor is an electric motor and said belt includes control means for controlling the operation of said external motor, a first pair of normally open electrical contacts adapted to be connected between said motor and a power supply for said motor, said control means being adapted to maintain said contacts in a conducting condition during movement of said belt from said second position towards said first position and to cause said first pair of contacts to assume a nonconducting condition when said belt is in said first position.

12. A photographic film assemblage as defined in claim 11 further including a second pair of normally open contacts connected in parallel with said first pair of contacts and adapted to be connected between said electric motor and said power supply, said control means being adapted to maintain said second pair of contacts in a conducting condition during movement of said belt from said first position to said second position and to cause said second pair of contacts to assume a nonconducting condition when said belt is in said second position.

13. A photographic assemblage as defined in claim 10 wherein said container includes a wall positioned adjacent a portion of said belt, said wall having at least one aperture therein for receiving therethrough switch means connected between a source of power and said external motor and adapted to engage said control means on said belt for controlling the operation of said external motor.

14. A photographic film assemblage as defined in claim 10 further including a first pair of normally open contacts adapted to be connected between an electric motor and a power supply for said motor, said control means including means for conductively bridging said first pair of contacts as said belt moves from said second position towards said first position.

15. A photographic film assemblage as defined in claim 14 further including a second set of normally open contacts connected in parallel with said first set of contacts and adapted to be connected between said motor and said power supply, said control means including means for conductively bridging said second set of contacts as said belt moves from said first position towards said second position.

16. A photographic film assemblage as defined in claim 8 wherein the width of said opening is greater than the width of said film units.

17. A photographic film assemblage as defined in claim 8 wherein the length of said opening as measured in the direction of movement of said belt is less than the length of said film units.

18. A photographic film assemblage as defined in claim 8 wherein said engagement means include a resilient engagement member for engaging said one film unit.

19. A photographic film assemblage as defined in claim 8 wherein said means for supporting said belt includes a sprocket having projections for engaging openings in one edge of said belt and means for coupling said sprocket with drive means in apparatus with which said assemblage is adapted to be employed.

20. A photographic film assemblage as defined in claim 8 including switch means connected to a source of power for controlling the operation of a motor for driving said belt and control means on said belt for actuating said switch means to control the flow of current through said switch means and said motor.

21. A photographic film assemblage as defined in claim 20 wherein said control means include aperture means for allowing said switch means to assume a nonconducting position.

22. A photographic film assemblage as defined in claim 20 wherein said control means includes a nonconducting portion of said belt.

23. A photographic film assemblage as defined in claim 8 wherein said container includes a second opening, said second opening being adapted to position stop means in the path of travel of the film unit located closest said wall towards said slot for preventing the movement of the said film unit by said engagement means as said belt moves from said first position toward said second position.